(12) United States Patent
Heo

(10) Patent No.: US 7,586,549 B2
(45) Date of Patent: Sep. 8, 2009

(54) VIDEO APPARATUS AND METHOD FOR CONTROLLING THE SAME

(75) Inventor: Eun Young Heo, Gyeongsangbuk-do (KR)

(73) Assignee: LG Electronics, Inc., Seoul (KR)

( * ) Notice: Subject to any disclaimer, the term of this patent is extended or adjusted under 35 U.S.C. 154(b) by 557 days.

(21) Appl. No.: 11/168,384

(22) Filed: Jun. 29, 2005

(65) Prior Publication Data

US 2006/0044479 A1 Mar. 2, 2006

(30) Foreign Application Priority Data

Aug. 27, 2004 (KR) .................. 10-2004-0068046

(51) Int. Cl.
*H04N 5/781* (2006.01)
*H04N 5/60* (2006.01)

(52) U.S. Cl. ........................ 348/738; 386/96
(58) Field of Classification Search .......... 348/738, 348/725, 552, 553; 381/57
See application file for complete search history.

(56) References Cited

U.S. PATENT DOCUMENTS

| 6,591,198 B1* | 7/2003 | Pratt ........................... 702/35 |
| 2004/0127198 A1* | 7/2004 | Roskind et al. .......... 455/412.2 |
| 2004/0252979 A1* | 12/2004 | Momosaki et al. ............ 386/96 |
| 2006/0014569 A1* | 1/2006 | DelGiorno .................. 455/567 |

* cited by examiner

*Primary Examiner*—Paulos M Natnael
(74) *Attorney, Agent, or Firm*—Birch, Stewart, Kolasch & Birch, LLP

(57) ABSTRACT

Provided herein are a video apparatus and a method for controlling the same, wherein a caption is displayed according to the volume level of surrounding noise. The method comprises detecting the volume level of noise surrounding the video apparatus, obtaining an audio volume level, comparing the surrounding noise volume level with the obtained audio volume level, and displaying a caption according to a result of the comparison.

10 Claims, 5 Drawing Sheets

VIDEO APPARATUS AND METHOD FOR CONTROLLING THE SAME

This application claims the benefit of Korean Patent Application No. 10-2004-0068046, filed on Aug. 27, 2004, which is hereby incorporated by reference as if fully set forth herein.

BACKGROUND OF THE INVENTION

1. Field of the Invention

The present invention relates to a video apparatus, and more particularly, to a video apparatus and a method for controlling the same, wherein a caption function is automatically turned on/off.

2. Discussion of the Related Art

At present, most televisions (TVs) have a caption function, so that a viewer can select and view a desired one of captions in English, Japanese, French, etc. according to his/her taste when viewing a broadcasting program containing caption data.

In response to the viewer's command, the TV detects caption data contained in a TV program or recorded on a video tape and displays the detected caption data on the screen thereof. Such TVs are widely installed in public places such as offices, buses, trains, waiting rooms, lobbies, and so forth, as well as in most homes.

In the case of viewing a TV in a public place, viewers may be unable to clearly hear audio from the TV due to surrounding noise, etc. In addition, even if the volume of the TV is raised, the audio from the TV may not be accurately transferred to the viewers due to the environmental characteristics of the public space.

An existing TV will hereinafter be described with reference to the annexed drawings.

FIG. 1 is a block diagram showing the configuration of a TV according to a related art.

As shown in FIG. 1, the conventional TV comprises a tuner/channel decoder unit 1, a controller 2, a data processor 3, a display unit 4, and an audio output unit 5.

The tuner/channel decoder unit 1 consists of a tuner for selecting a channel desired by the user, and a channel decoder for decoding a broadcast signal inputted over the selected channel into a transport stream format. The data processor 3 is adapted to encode and/or decode data decoded into the transport stream format by the tuner/channel decoder unit 1 so that the data can be reproduced or stored. The display unit 4 is adapted to display video and caption data processed by the data processor 3. The audio output unit 5 is adapted to output audio data processed by the data processor 3. The controller 2 is adapted to control the overall operation of the TV including the above components.

In the TV with the aforementioned configuration, as shown in FIG. 2, if the user tunes to a broadcast signal using a remote controller or key button (S1), then the tuner/channel decoder unit 1 decodes the tuned broadcast signal into a transport stream format and detects caption data contained in the broadcast signal (S2).

When the user turns on a caption function through a menu function of the TV under the condition that the caption data is present in the broadcast signal (S3), the controller 2 recognizes such a situation, and thus processes the caption data through the data processor 3 and outputs the processed data to the display unit 4.

However, the above-mentioned TV has problems as follows.

Firstly, the caption function is manually performed through the use of the remote controller or key button by the user. Moreover, in public places such as waiting rooms, lobbies, trains, buses, etc., there is no remote controller around the user.

Secondly, when the user suddenly encounters surrounding noise in a public place, he/she cannot clearly hear audio from the TV if the audio from the TV is mixed with the surrounding noise, even though the volume of the TV is raised. In this case, the user has to absolutely use the remote controller to instantaneously perform the caption function.

SUMMARY OF THE INVENTION

Accordingly, the present invention is directed to a video apparatus and a method for controlling the same that substantially obviate one or more problems due to limitations and disadvantages of the related art.

An object of the present invention is to provide a video apparatus and a method for controlling the same, wherein a caption is displayed according to surrounding noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video apparatus comprises a surrounding noise detector to detect a volume level of noise surrounding the video apparatus, an audio volume level a provider to supply an audio volume level, and a controller to compare the surrounding noise volume level with the supplied audio volume level and display a caption on a screen according to a result of the comparison.

In another aspect of the present invention, there is provided a method for controlling a video apparatus, the method comprising: detecting a volume level of noise surrounding the video apparatus, obtaining an audio volume level, comparing the surrounding noise volume level with the obtained audio volume level, and displaying a caption according to a result of the comparison.

In yet another aspect of the present invention, there is provided a method of controlling a caption display, the method comprising: automatically turning on/off a caption on a screen of a device depending on a volume level of noise surrounding the device.

In yet another aspect of the present invention, there is provided a caption displaying device comprising: a controller to automatically turn on/off a caption on a screen depending on a volume level of noise surrounding the caption displaying device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
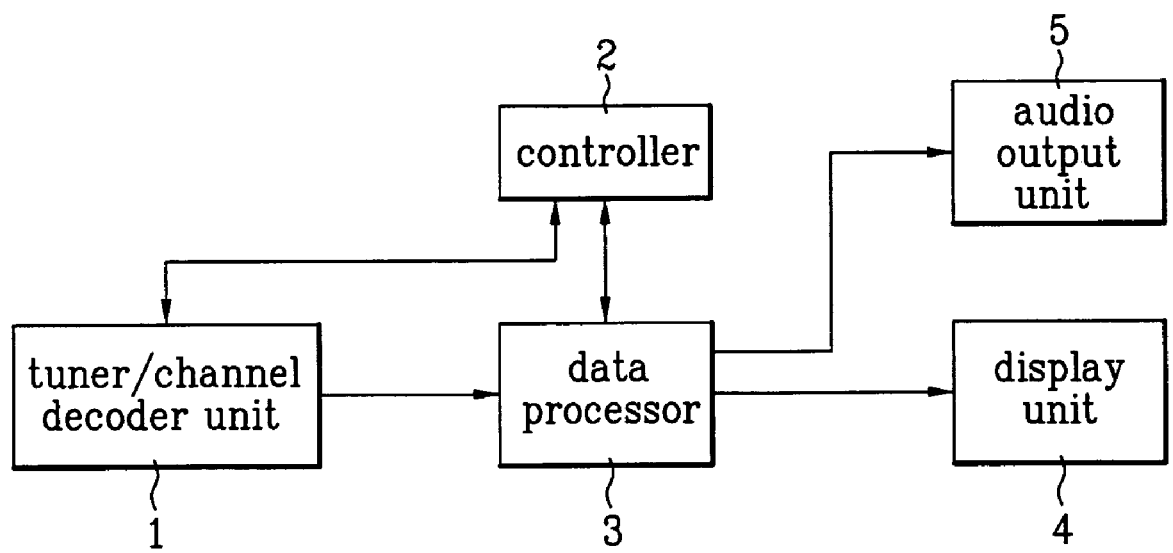
FIG. 1 is a block diagram showing the configuration of a TV according to a related art.
Figure 2:
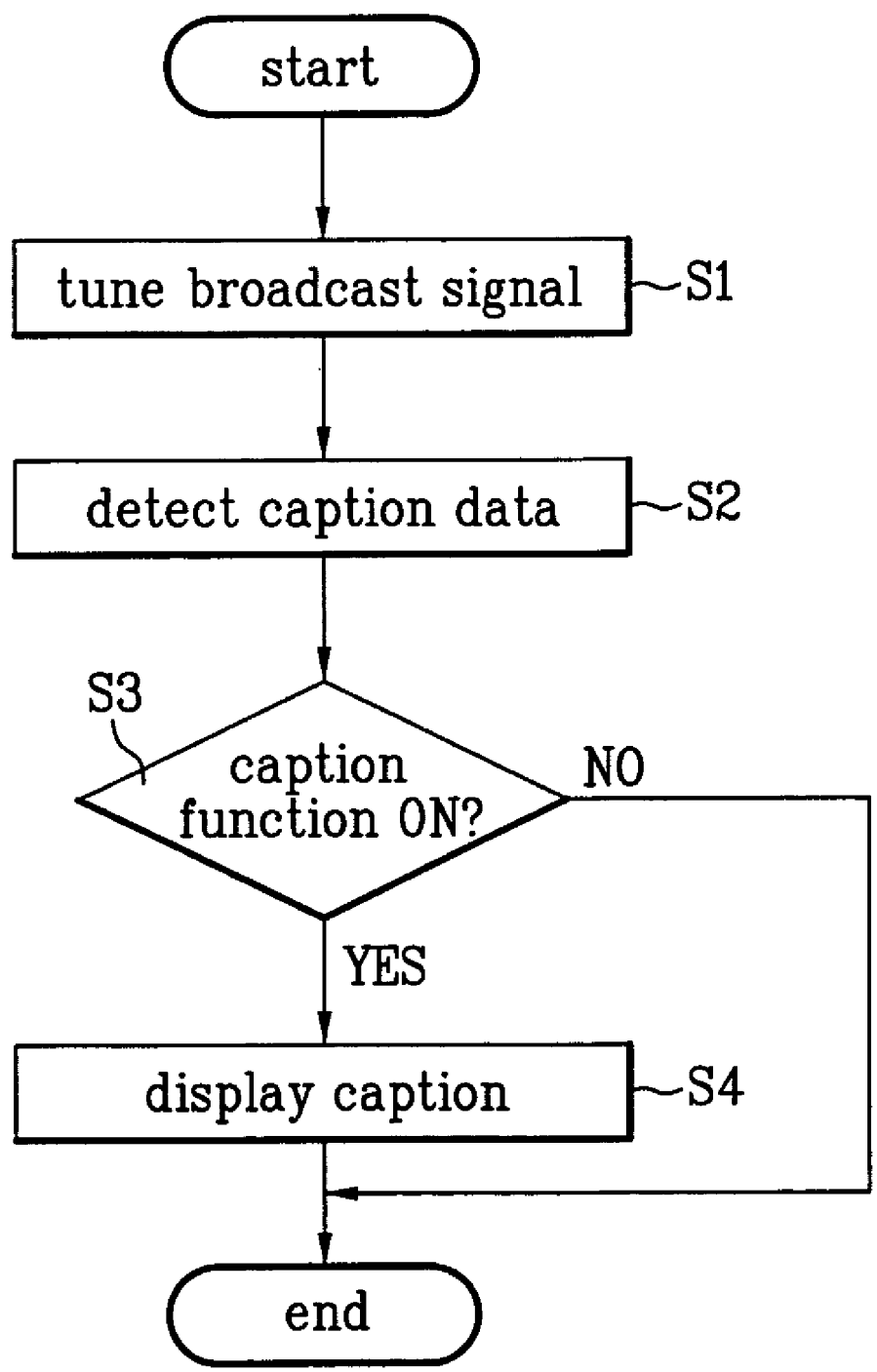
FIG. 2 is a flow chart illustrating a caption display method of the TV in FIG. 1.
Figure 3:
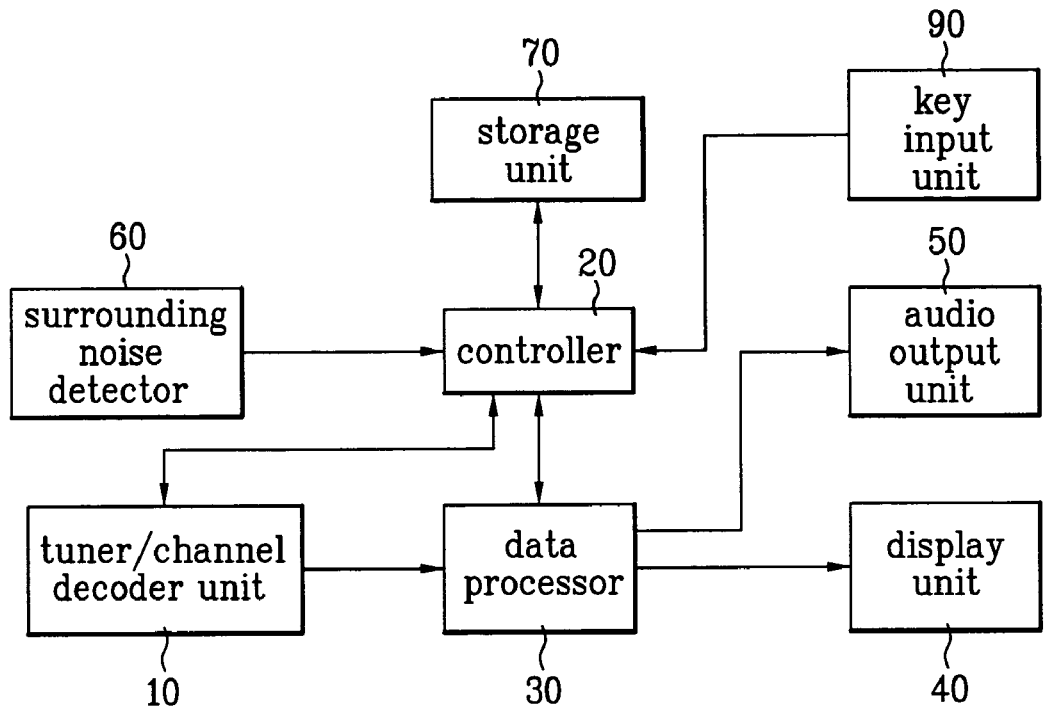
FIG. 3 is a block diagram showing the configuration of a video apparatus according to a first embodiment of the present invention.

FIG. 3 is a block diagram showing the configuration of a video apparatus according to a first embodiment of the present invention. As shown in this drawing, the video apparatus according to the first embodiment of the present invention comprises a tuner/channel decoder unit 10, a controller 20, a data processor 30, a display unit 40, an audio output unit (e.g., a speaker) 50, a surrounding noise detector 60, a storage unit 70, and a key input unit 90, all operatively coupled.

The tuner/channel decoder unit 10 is adapted to select a channel desired by the user and decode a broadcast signal of the selected channel into a transport stream format. To this end, the tuner/channel decoder unit 10 is made up of a tuner and a channel decoder.

The data processor 30 is adapted to encode and/or decode data decoded into the transport stream format by the tuner/channel decoder unit 10 so that the data can be reproduced or stored. To this end, the data processor 30 includes a video processor for transforming a video signal into displayable data, and an audio processor for transforming an audio signal into data that can be outputted through the audio output unit 50, such as a speaker. The data processor 30 is further adapted to transform caption data provided from the controller 20 into displayable data. The data processor 30 is also adapted to receive a video signal sent from an external device, such as a video cassette recorder (VCR), a digital versatile disc (DVD) player, a personal video recorder (PVR) or the like, and transform the received video signal into displayable data.

The display unit 40 is adapted to display video and caption data processed by the data processor 30, and the audio output unit 50 is adapted to output audio data processed by the data processor 30.

The surrounding noise detector 60 is adapted to detect the volume level of noise surrounding the video apparatus, analog/digital-convert the detected surrounding noise volume level into data that can be recognized by the controller 20, and send the converted data to the controller 20.

The controller 20 is adapted to receive additional information contained in the broadcast signal of the selected channel from the tuner/channel decoder unit 10 and store the received additional information in the storage unit 70. The additional information contains broadcasting program information, a caption, etc. The controller 20 is also adapted to control the overall operation of the video apparatus and memorize a caption function ON/OFF state. The controller 20 is further adapted to compare the surrounding noise volume level detected by the surrounding noise detector 60 with an audio volume level selected by the user through the key input unit 90, such as a remote controller, a key panel or the like, and automatically turn a caption function on/off according to a result of the comparison.

The storage unit 70 is adapted to store the audio volume level selected by the user through the key input unit 90. In other words, the storage unit 70 stores the volume level (dB) of audio outputted from the audio output unit 50 in response to the user's command. A separate memory can be additionally provided to constitute the storage unit 70. Alternatively, a part of any one of the existing storage units of the video apparatus, preferably an EEPROM, flash memory or hard disk, may be used as the storage unit 70.

In the first embodiment of the present invention as stated above, the controller 20 compares the surrounding noise volume level detected by the surrounding noise detector 60 with the audio volume level stored in the storage unit 70 and automatically turns the caption function on/off according to the comparison result.

Figure 4:
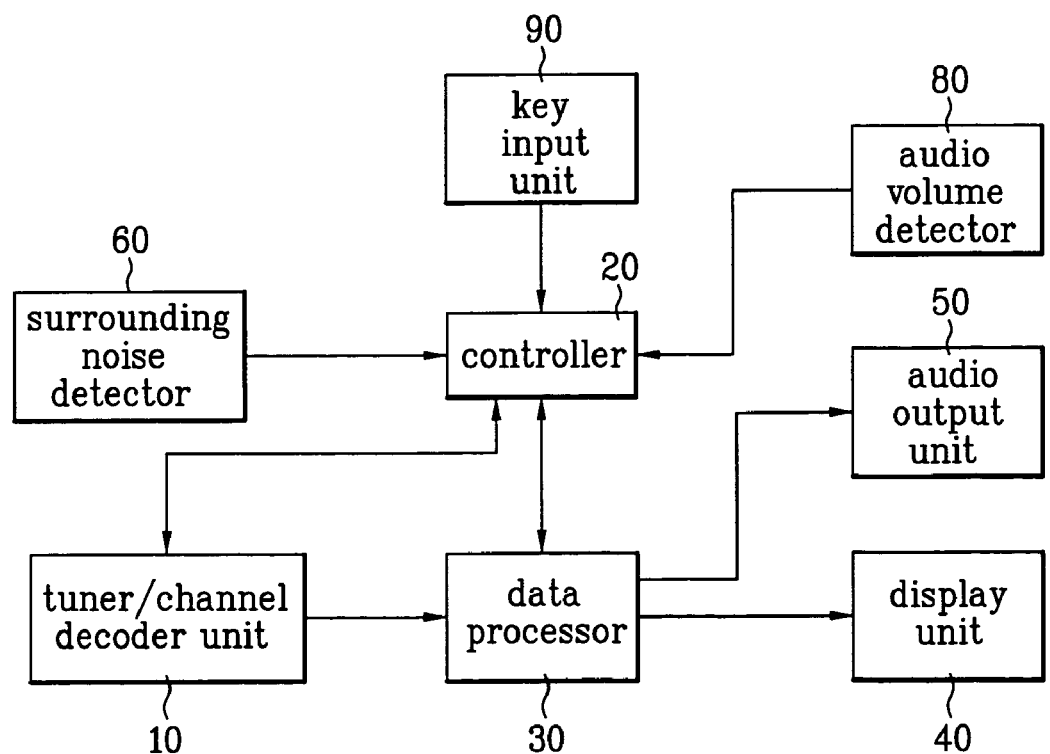
FIG. 4 is a block diagram showing the configuration of a video apparatus according to a second embodiment of the present invention.

FIG. 4 is a block diagram showing the configuration of a video apparatus according to a second embodiment of the present invention. The video apparatus of the second embodiment further comprises an audio volume detector 80 for detecting the volume level of audio outputted from the audio output unit 50, in addition to the configuration of the video apparatus of the first embodiment. The audio volume detector 80 analog/digital-converts the detected audio volume level into a digital signal and sends the converted digital signal to the controller 20. Thus, the controller 20 compares the surrounding noise volume level detected by the surrounding noise detector 60 with the audio volume level detected by the audio volume detector 80 and automatically turns the caption A function on/off according to a result of the comparison.

Figure 5:
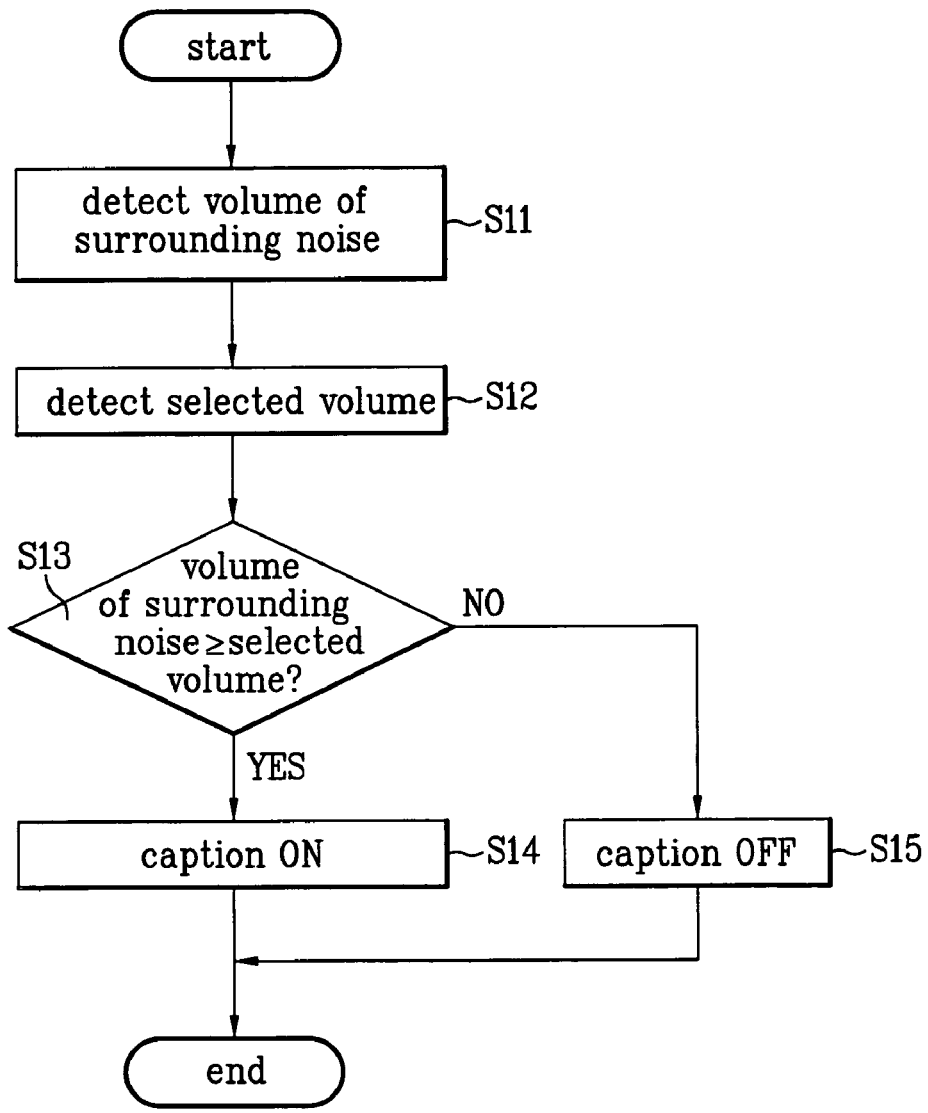
FIG. 5 is a flow chart illustrating an automatic caption execution method of the video apparatus according to the first embodiment of the present invention.

FIG. 5 is a flow chart illustrating a method for controlling the video apparatus according to a first embodiment of the present invention. This method can be implemented in the video apparatus of FIG. 3 or 4, or other suitable device.

Figure 6:
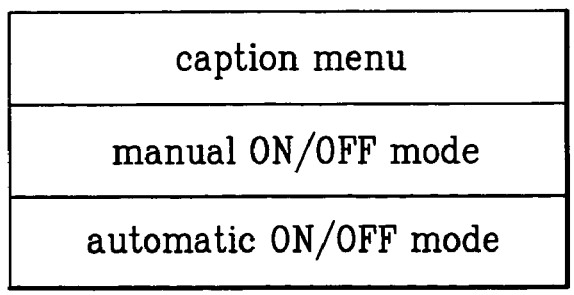
FIG. 6 is a view illustrating a caption menu for selection of a caption mode.

The video apparatus of the present embodiment provides a manual ON/OFF mode and automatic ON/OFF mode for the caption function. If a caption menu of FIG. 6 is displayed on the screen of the video apparatus, the user can select any one of the manual ON/OFF mode and automatic ON/OFF mode in the displayed caption menu. When the automatic ON/OFF mode is selected by the user, the controller 20 detects the volume level of surrounding noise (S11). The controller 20 also detects an audio volume level selected by the user (S12). At this time, in order to detect the selected audio volume level, the controller 20 reads an audio volume level stored in the storage unit 70 (e.g., in FIG. 3) or detects the volume level of audio outputted from the audio output unit 50 and detected by the audio output detector 80 (e.g., in FIG. 4).

The controller 20 then periodically compares the surrounding noise volume level with the selected audio volume level (S13). For example, if the surrounding noise volume level is higher than or equal to the selected audio volume level for a predetermined period of time (e.g., 1 to 5 sec) or a predetermined number of times (e.g., 2 to 5 times), the controller 20 determines whether a caption is being currently displayed through the display unit 40. If a caption is being displayed, the controller 20 continuously executes the display of the caption. However, if no caption is displayed, the controller 20 transforms a caption into displayable data through the data processor 30 and then displays the resulting caption data through the display unit 40 (Sl4). In other words, when the volume level of the surrounding noise is so high that the user cannot listen to the actual audio outputted from the audio output unit 50 well, the controller 20 provides a caption to the user automatically. If the surrounding noise volume level is lower than the selected audio volume level, the controller 20 displays no caption through the display unit 40 (S15). When a caption is being automatically displayed through the display unit 40, the controller 20 turns the caption function off if the surrounding noise volume level becomes lower than the selected audio volume level.

Figure 7:
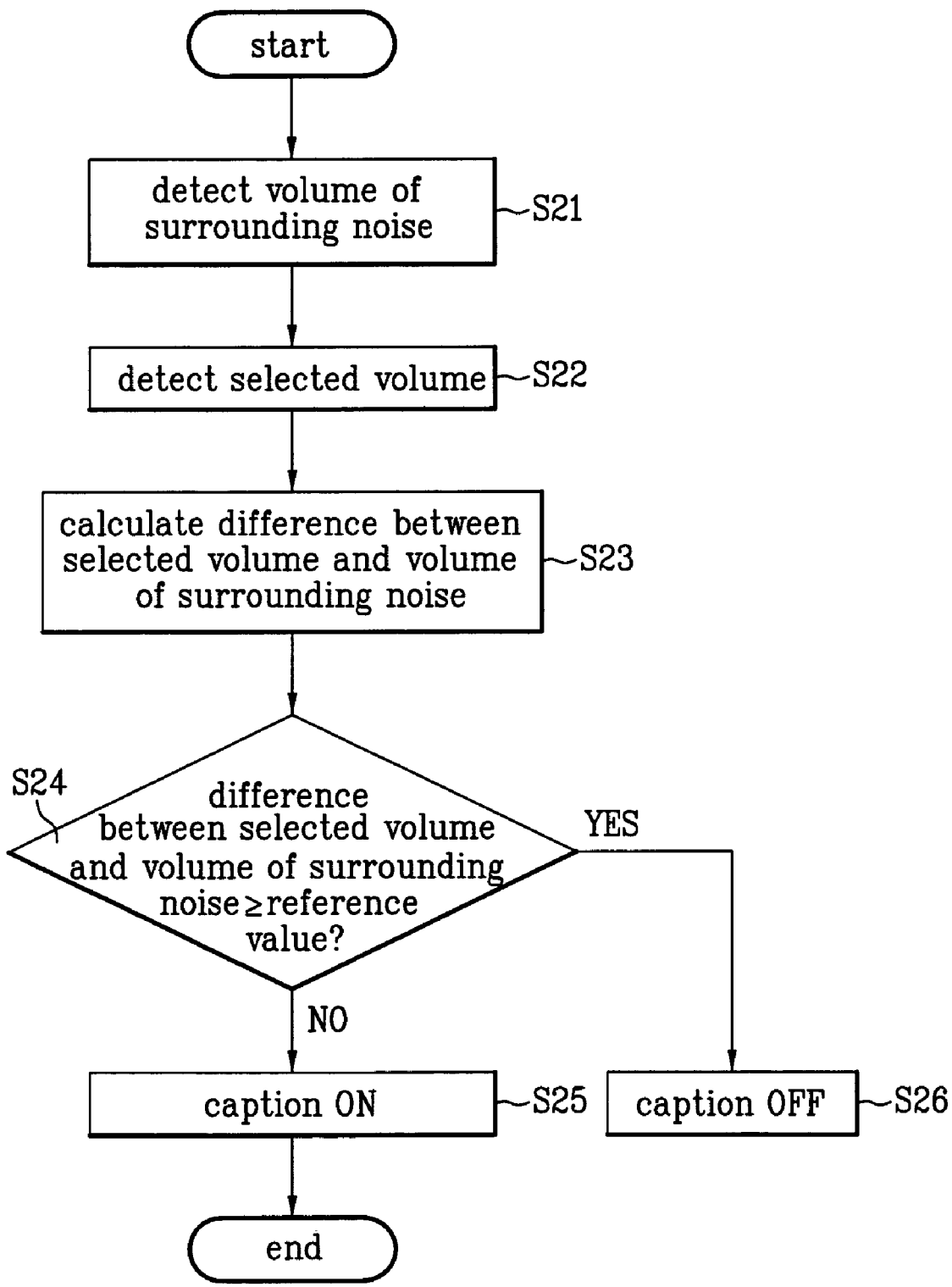
FIG. 7 is a flow chart illustrating an automatic caption execution method of the video apparatus according to the second embodiment of the present invention.

FIG. 7 is a flow chart illustrating a method for controlling the video apparatus according to a second embodiment of the present invention. This method can be implemented in the video apparatus of FIG. 3 or 4, or other suitable device.

The video apparatus of the present embodiment provides a manual ON/OFF mode and automatic ON/OFF mode for the caption function. When the automatic ON/OFF mode is selected by the user, the controller 20 detects the volume level of surrounding noise (S21). The controller 20 also detects an audio volume level selected by the user (S22). At this time, in order to detect the selected audio volume level, the controller 20 reads an audio volume level stored in the storage unit 70 (e.g., in FIG. 3) or detects the volume level of audio outputted from the audio output unit 50 (e.g., in FIG. 4).

The controller 20 then periodically calculates a difference between the selected audio volume level and the surrounding noise volume level (S23). Thereafter, the controller 20 periodically compares the difference between the selected audio volume level and the surrounding noise volume level with at least one reference value (e.g., −10 dB to +10 dB) (S24). For example, the controller 20 determines whether the difference between the selected audio volume level and the surrounding noise volume level is higher than or equal to +10 dB.

In this example, the surrounding noise volume level is subtracted from the selected audio volume level. If the difference between the selected audio volume level and the surrounding noise volume level is higher than or equal to +10 dB for a predetermined period of time (or a predetermined number of times), there is no need to display a caption because the surrounding noise volume level is much lower than the selected audio volume level. As a result, in this case, the controller 20 determines whether a caption is being displayed through the display unit 40, and then turns the caption function off if the caption is being displayed (S26).

On the contrary, if the difference between the selected audio volume level and the surrounding noise volume level is lower than +10 dB for the predetermined period of time, the controller 20 displays a caption because the surrounding noise volume level is higher than or similar to the selected audio volume level. At this time, if a caption is being displayed, the controller 20 continuously executes the display of the caption. However, if no caption is displayed, the controller 20 displays a caption (S25).

The reference value can be changed/selected by the user. Accordingly, the controller 20 may respond sensitively or insensitively to the volume level of surrounding noise.

As apparent from the above description, the video apparatus of the present invention can automatically display a caption according to the volume level of surrounding noise. Therefore, even when the surrounding noise is loud, the user can understand the contents of a broadcasting program through a caption. Further, if the surrounding noise is reduced, the video apparatus can automatically turn the caption function off, thereby making it possible to prevent the caption from being unnecessarily displayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a video apparatus, the method comprising:

storing an audio volume level selected by user in a storage unit;

detecting a volume level of noise surrounding the video apparatus;

comparing the surrounding noise volume level with the stored audio volume level; and automatically turning on or off a caption according to a result of the comparison, wherein the step of comparing comprises one of periodically comparing the surrounding noise volume level with the stored audio volume level for a predetermined number of times, and periodically comparing the surrounding noise volume level with the stored audio volume level for a predetermined period of time.

2. The method as set forth in claim 1, wherein the comparing step includes the steps of:

calculating a difference between the stored audio volume level and the surrounding noise volume level; and comparing the calculated difference with a predetermined reference value.

3. The method as set forth in claim 1, wherein the displaying step includes the step of displaying the caption if the surrounding noise volume level is higher than or equal to the stored audio volume level.

4. The method as set forth in claim 1, wherein the displaying step includes the step of displaying the caption if a difference between the stored audio volume level and the surrounding noise volume level is lower than a predetermined reference value.

5. The method as set forth in claim 1, further comprising:

providing a caption menu for selecting between a manual caption mode and an automatic caption mode.

6. A video apparatus comprising:

a surrounding noise detector adapted to detect a volume level of noise surrounding the video apparatus;

an audio volume level provider adapted to supply an audio volume level preselected by a user and stored in the storage unit; and a controller adapted to compare the surrounding noise volume level with the stored audio volume level and to automatically turn on or off a caption on a screen according to a result of the comparison, wherein the controller is further adapted to periodically compare the surrounding noise volume level with the stored audio volume level for a predetermined number of times, or periodically compare the surrounding noise volume level with the stored audio volume level for a predetermined period of time.

7. The video apparatus as set forth in claim 6, wherein the controller is adapted to calculate a difference between the supplied audio volume level and the surrounding noise volume level and compare the calculated difference with a predetermined reference value.

8. The video apparatus as set forth in claim 7, wherein the controller is adapted to display the caption if the difference between the supplied audio volume level and the surrounding noise volume level is lower than the reference value.

9. The video apparatus as set forth in claim 6, wherein the controller is adapted to display the caption if the surrounding noise volume level is higher than or equal to the supplied audio volume level.

10. The caption displaying device as set forth in claim 6, wherein the controller provides a caption menu on the screen for selecting between a manual caption mode and an automatic caption mode.

* * * * *